(12) United States Patent
Bestgen

(10) Patent No.: US 6,626,217 B2
(45) Date of Patent: Sep. 30, 2003

(54) ASSEMBLY CONSISTING OF A TIRE, A RIM AND AN ADAPTER

(75) Inventor: Luc Bestgen, Chatel-Guyon (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/034,044

(22) Filed: Dec. 20, 2001

(65) Prior Publication Data

US 2002/0088520 A1 Jul. 11, 2002

Related U.S. Application Data

(63) Continuation of application No. PCT/EP00/05384, filed on Jun. 13, 2000.

(30) Foreign Application Priority Data

Jun. 21, 1999  (FR) ............................................. 99 07880

(51) Int. Cl.⁷ ............................ B60C 5/16; B60C 15/02
(52) U.S. Cl. .................................. 152/379.4; 152/381.4
(58) Field of Search ............................. 152/375, 379.3, 152/379.4, 379.5, 381.4, 387, 393, 399, 400, 453, 454, DIG. 9

(56) References Cited

U.S. PATENT DOCUMENTS

| 3,392,772 A | 7/1968 | Pope |
|---|---|---|
| 3,486,547 A | * 12/1969 | Powers |
| 4,307,767 A | * 12/1981 | Calori |
| 4,373,567 A | * 2/1983 | Declercq ............. 152/379.3 X |
| 4,798,418 A | * 1/1989 | Kempf et al. ............ 152/379.3 |
| 5,215,137 A | * 6/1993 | Weeks et al. ............ 152/379.4 |
| 5,232,032 A | * 8/1993 | Diernaz ................... 152/379.4 |
| 5,232,033 A | 8/1993 | Durif |
| 5,232,034 A | * 8/1993 | Gergele ...................... 152/394 |
| 5,507,333 A | 4/1996 | Augier |

FOREIGN PATENT DOCUMENTS

| FR | 1267264 | 6/1961 |
|---|---|---|
| FR | 2610872 | 8/1988 |
| GB | 2202195 | 9/1988 |

* cited by examiner

Primary Examiner—Russell D. Stormer
(74) Attorney, Agent, or Firm—Baker Botts L.L.P.

(57) ABSTRACT

A rolling assembly formed of a tire P, a narrow rim J, the width of which is at most equal to 50% of the maximum axial width of the tire inflated to its operating pressure, and two connecting elements or adapters A which form the join between the mounting rim J and the beads of the tire P. The adapters A are formed of reinforced rubber mixes which are elastically deformable at least in both the radial and axial directions.

23 Claims, 5 Drawing Sheets

ASSEMBLY CONSISTING OF A TIRE, A RIM AND AN ADAPTER

CROSS REFERENCE TO RELATED APPLICATION

This is a continuation of international application PCT/EP 00/05384, filed Jun. 13, 2000 and published as WO 00/78565 A1 in French on Dec. 28, 2000, which claims priority of French application 99/07880, filed Jun. 21, 1999.

TECHNICAL FIELD OF THE INVENTION

The present invention relates to a rolling assembly formed primarily of a tire, a rim and an adapter between the rim and the tire.

BACKGROUND OF THE INVENTION

A tire commonly used nowadays comprises primarily a tread intended to provide contact with the ground, the tread generally being reinforced by a tread reinforcement, also referred to as a crown reinforcement, which makes it possible to impart to the crown the rigidity in three dimensions which is necessary for rolling of the tire. The crown reinforcement also controls the radial expansion of a carcass reinforcement, which is generally made up of one or more plies of radial reinforcement elements. The carcass reinforcement contains the inflation agent within reasonable limits of deformation of the tire when static and during travel. As is known, the carcass reinforcement is generally anchored within each bead to a reinforcement ring, the beads ensuring the contact with the rim and flange of the mounting rim of the tire.

The transmission of the mechanical forces between the tire and the rim, resulting from the inflation, loading and travel of the tire, and the airtightness of the tire are ensured by the distribution and the magnitude of the contact forces between the bead and the rim seat and rim flange. Good behavior of the tire, both from the point of view of service life and from the point of view of properties imparted to the vehicle fitted therewith, and a good quality/price ratio of the mounting rim have resulted in the adoption of a ratio of rim width to maximum axial width of the tire of close to 0.7. It is clearly known that this ratio is merely a compromise, and that a certain number of properties of the tire, for example its road-holding characteristics, are improved by using a rim which permits a higher ratio. Reciprocally, other properties may be improved, obviously to the detriment of the former, by use of a narrow rim; that is to say, leading to a ratio, as defined above, of close to or less than 0.40.

French Patent 1,267,264, in order to impart to a tire the opposing properties of comfort, road-holding, low rolling resistance and high wear resistance, discloses an outline solution, consisting of imparting to the carcass reinforcement a structure which effectively opposes the transverse flexibility without adversely affecting the radial structural flexibility. Such structure is obtained by superposing on the initial structure of radial reinforcement elements in the carcass reinforcement a secondary structure of inextensible circumferential reinforcement elements. The secondary structure may, furthermore, modify the shape of the sidewalls of the tire, which shape is imparted by the meridian profile of equilibrium of the center axis of the carcass reinforcement. Inextensible, circumferential reinforcement elements of a diameter substantially equal to or less than the diameter of the rim flange, which are arranged radially and axially to the inside of the radial elements of the carcass reinforcement, enable the carcass reinforcement to have a meridian profile which forms a tangent virtually horizontally to the annular anchoring element of the carcass reinforcement.

The foregoing principle is taken up in U.S. Pat. No. 3,486,547, and more particularly with application to a width of the mounting rim which is substantially less than the width of the tread, the ratio of the rim width to the maximum axial width of the tire, in the example given, being 0.41. Although it has advantageous properties, such tire is not without its disadvantages as far as the ability to steer the vehicle fitted therewith is concerned. This results because the reinforcement structure intended to stabilize the secondary structure has a very high rigidity of extension, and a significantly lower compressive strength, in the circumferential direction. The difference in the modulus of the reinforcement structure, depending on whether one is in extension or in compression in the radial direction, means that significant ovalisation of the outer lower part is observed when such a tire is subjected to a vertical load. Upon application of a transverse force to such an axially loaded tire, a non-linear response of the tire occurs depending on whether the force applied has or has not been sufficient to place back under tension that part which was placed under compression during ovalisation.

SUMMARY OF THE INVENTION

In order to overcome the foregoing disadvantages of the prior art, the present invention proposes dissociating, within a tire as described above, that part which may be considered as working really like a tire from the part which may be considered as working like a rim. The rolling assembly according to the invention is formed of a tire, a narrow rim, the width of which is at most 50% of the maximum axial width of the tire inflated to its operating pressure, and two connecting elements or adapters which form the join between the mounting rim and the beads of the tire, which adapters are formed of reinforced rubber mixes that are elastically deformable at least in both the radial and axial directions.

As used herein, the terminology "adapter which is elastically deformable in both the radial and axial directions" is to be understood to mean an adapter which permits displacement between the bead of the tire and the mounting rim in the radial direction of at least 5% of the deflection of the loaded tire at recommended load and pressure, and in the axial direction movement of the bead and the rim towards each other of a value at least equal to 15 mm at zero pressure, such deformations being cancelled out if the stresses or forces which cause them are suppressed.

The narrow rim may be of different types: it may be formed, as is known per se, of two rim seats that are extended axially to the outside by two rim flanges directed radially towards the outside and joined axially to the inside by a mounting groove. The presence of a mounting groove may prove not to be necessary, in which case the two seats may be extended axially and radially towards the inside by two radial discs attached by bolts. The two rim seats may also be extended axially towards the inside by two flat parts, which in turn are extended axially and radially by two radial annular discs that are axially spaced apart and permit the fixing thereto of a bead-clamping plate which may complete the rim and may possibly act as a bearing support for the tread in the event of the tire travelling at low or even zero pressure. The plate may be composed circumferentially of a plurality of independent parts.

The mounting rim may also be of the type having a rim with flanges that are directed radially towards the inside, as described and illustrated in French Patent 2,610,872, the beads of the tire in such case becoming lodged on the rim seats via the inside.

In accordance with the invention, a connecting element or adapter between a tire bead and the narrow mounting rim preferably includes primarily a bead, which ensures hooking of the adapter to the rim, and a reinforcement structure, which permits deformation at least in both the radial and axial directions, and creates the connection proper between the bead and a metal reinforcement of the adapter intended to receive the tire bead. The makeup of the bead of the connecting element or adapter is a function of the hooking system of the mounting rim, but preferably comprises a circumferential anchoring ring that may be a simple ring of rubber mix, whether reinforced or not, or a bead wire or a stack of circumferentially oriented reinforcement elements. Around the anchoring ring, by turning-up, or between the reinforcement elements of the ring, by clamping, there is anchored the reinforcement structure of the adapter. The reinforcement structure may be the same components as those used for a known tire carcass reinforcement, that is to say, one or more plies of reinforcement elements that are radial or crossed from one ply to the next, forming a given angle with the circumferential direction of the tire. Such reinforcement elements may be textile and/or metal and/or plastic elements, in the form of monofilaments and/or cables and/or slices.

The second edge of the reinforcement structure of the adapter is joined to an adapter reinforcement. The terminology "adapter reinforcement" as used herein is to be understood to mean an assembly formed of at least one rim seat, such seat possibly being extended axially to the outside by a rim flange, with the rim flange possibly being of low height and of conventional shape, in particular curved at its end. The adapter reinforcement may be of metal coated with a rubber mix. The edge of the reinforcement structure of the adapter is anchored to the adapter reinforcement either by superposition radially to the outside, or by winding about the flange, if there is one, the bead of the tire being applied upon mounting on the reinforcement structure of the adapter.

BRIEF DESCRIPTION OF THE DRAWINGS

The characteristics and advantages of the invention will be better understood with reference to the following description, which refers to the drawings illustrating examples of embodiments in a non-limitative manner, in which.

DESCRIPTION OF ILLUSTRATIVE EMBODIMENTS OF THE INVENTION

The assembly according to the invention is composed of a tire P, an adapter A and a mounting rim J. The tire P, as is known, is formed of a tread, reinforced by a crown reinforcement of one or more layers of reinforcement elements, and joined to two beads B on either side of the equatorial plane X–X' by means of two sidewalls 13. A carcass reinforcement 10, primarily reinforcing the sidewalls 13, is anchored in each bead B to at least one bead wire 11 of "braided" type to form upturns 12, which are separated from the main carcass reinforcement part by profiled elements 14 of a virtual triangular shape.

Figure 1:
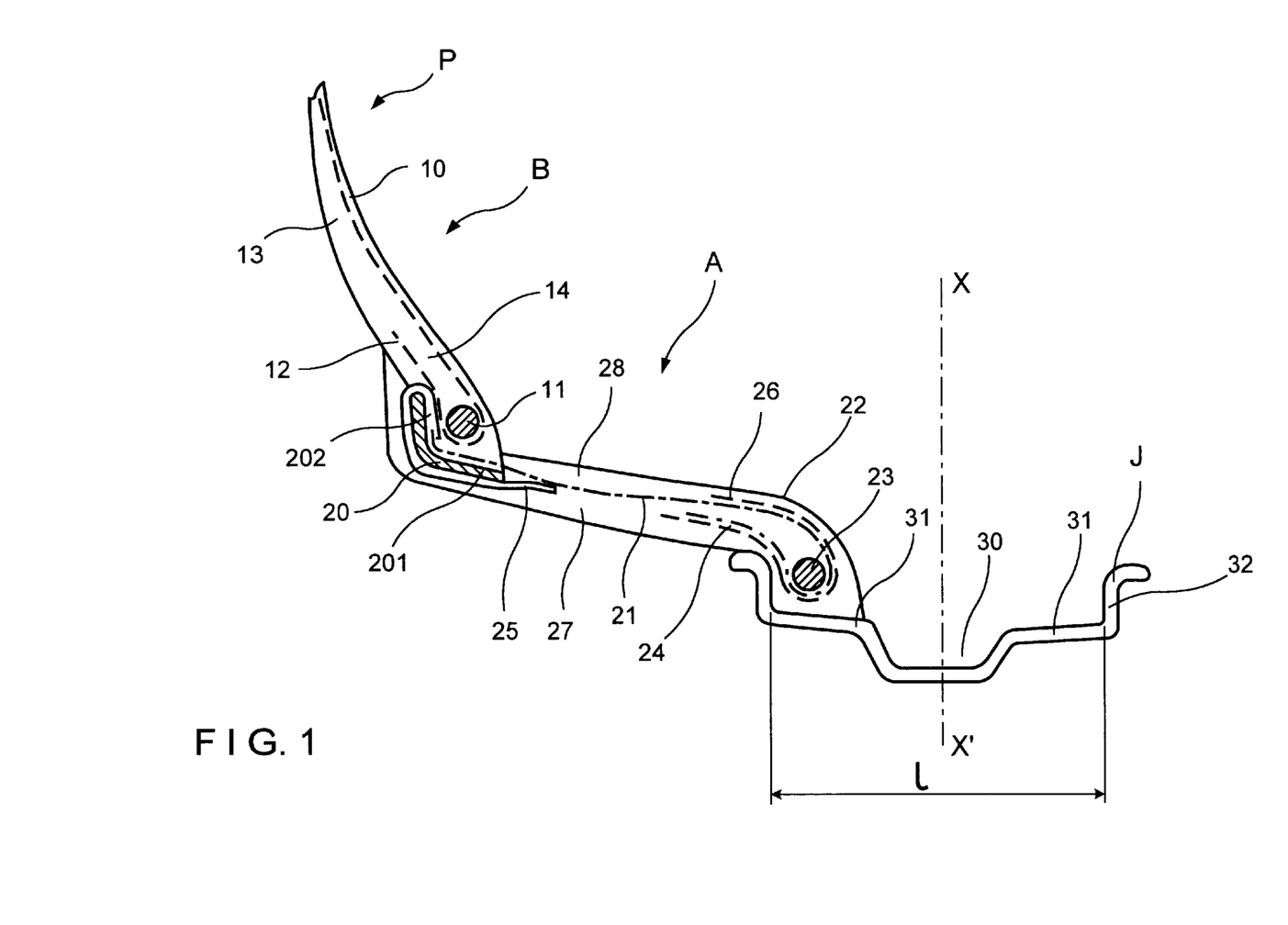
FIG. 1 is a diagram, viewed in meridian section, of a first embodiment of the assembly according to the invention.

In the embodiment of FIG. 1, the mounting rim J is of conventional construction, with what is called a mounting groove 30 joining, on either side of the equatorial plane X–X', two rim seats 31, having frustoconical generatrices which form an angle of 5° with the axis of rotation. The seats 31 are extended axially towards the outside by rim flanges 32, the radially outer edges of which are curved. The special feature of the rim J is its axial width 1, which is equal in the embodiment shown to 45 mm, and very much less than 50% of the maximum axial width of the tire P as mounted and inflated to its recommended pressure.

The adapter A is arranged between the rim J and the bead B of the tire P and is formed mainly of an adapter reinforcement element 20 that is joined to an adapter bead 22 by means of a reinforcement structure 21. The adapter reinforcement element 20, which is of metal in the example described, but which could be of plastics material or of composite material such as a resin reinforced by fibers of any type, has a modulus of compression equal or substantially equal to its modulus of extension. It is formed of a seat 201 that is inclined, in this example, relative to the axis of rotation of the assembly by an angle of 5° and extended axially and radially to the outside by a flange 202. The dimensions of the element 20 are standardized, be it the height of the flange 202 or the axial width of the seat 201. The walls of the reinforcement element 20 are treated, for example brass-coating in the case embodiment of FIG. 1 of a metal reinforcement, to permit correct adhesion to the rubber mixes used in the main reinforcement 21 and any additional reinforcements of the adapter A.

The reinforcement structure 21 is formed of a ply of textile cables made of aromatic polyamide which are parallel to each other within the ply and are radial. The ply is firstly joined axially to the inside and radially to the outside to the walls of the metal adapter reinforcement 20, and is secondly anchored within each adapter bead 22 to an annular bead reinforcement element 23, such as a bead wire, to form an upturn 24. The main reinforcement structure 21 further includes additional reinforcements. Within the bead 22, and axially to the outside of the main part of the reinforcement ply 21 and its upturn 24, there is arranged a first bead reinforcement ply 26, comprising a fabric of aliphatic polyamide formed of reinforcement elements which are parallel to each other within each layer of fabric and are crossed between each other. On the side of the reinforcement element 20 of the adapter A there is arranged an additional reinforcement 25 formed of a fabric identical to that of the ply 26, i.e., comprising two layers of textile elements of aliphatic polyamide which are parallel to each other within each ply and are crossed from one layer to the next, forming an angle of 45° with the circumferential direction. The reinforcement 25 partially covers the axially inner wall, then the upper end and then the axially outer wall of the flange 202 and finally covers the radially inner wall of the seat 201. The axially inner edge of the reinforcement 25 is joined to the main reinforcement ply 21, the axially inner end of which edge is distant from the equatorial plane X–X' by an amount less than the distance between that plane and the axially inner end of the seat 201. The adapter A is completed, firstly by a layer 27 of protective rubber mix covering on the outside of the reinforcement element 20 and the radially inner face of the adapter and providing the connection to the hook of the mounting rim J by surrounding the reinforcements 21 and 26, and secondly, on its radially inner face, which is intended to be in contact with the inflation gas for the assembly, by an inner layer 28 of a mix which is impermeable to said gas.

In the embodiment shown in FIG. 2, wherein like parts are identified by like reference characters, differs from that of FIG. 1 primarily in the following respects. The tire P has beads that are inclined relative to the axis of rotation of the assembly by an angle of 20°, and are reinforced by bead wires 11 of the rectangular type. The mounting rim J has a mounting groove 30 which is turned towards the interior of the assembly, seats 31 inclined relative to the axis of rotation by an angle of 15° and extended axially to the outside and radially towards the inside by rim flanges 32 having curved edges, which rim receives the beads of the adapter A via the inside. The adapter A is comprised of a metal adapter reinforcement 20, having a seat 201 inclined relative to the axis of rotation of the assembly by an angle of 15° and extended axially and radially to the outside by a flange 202, the other dimensions of said elements being standardized, be it the height of the flange 202 or the axial width of the seat 201.

Figure 2:
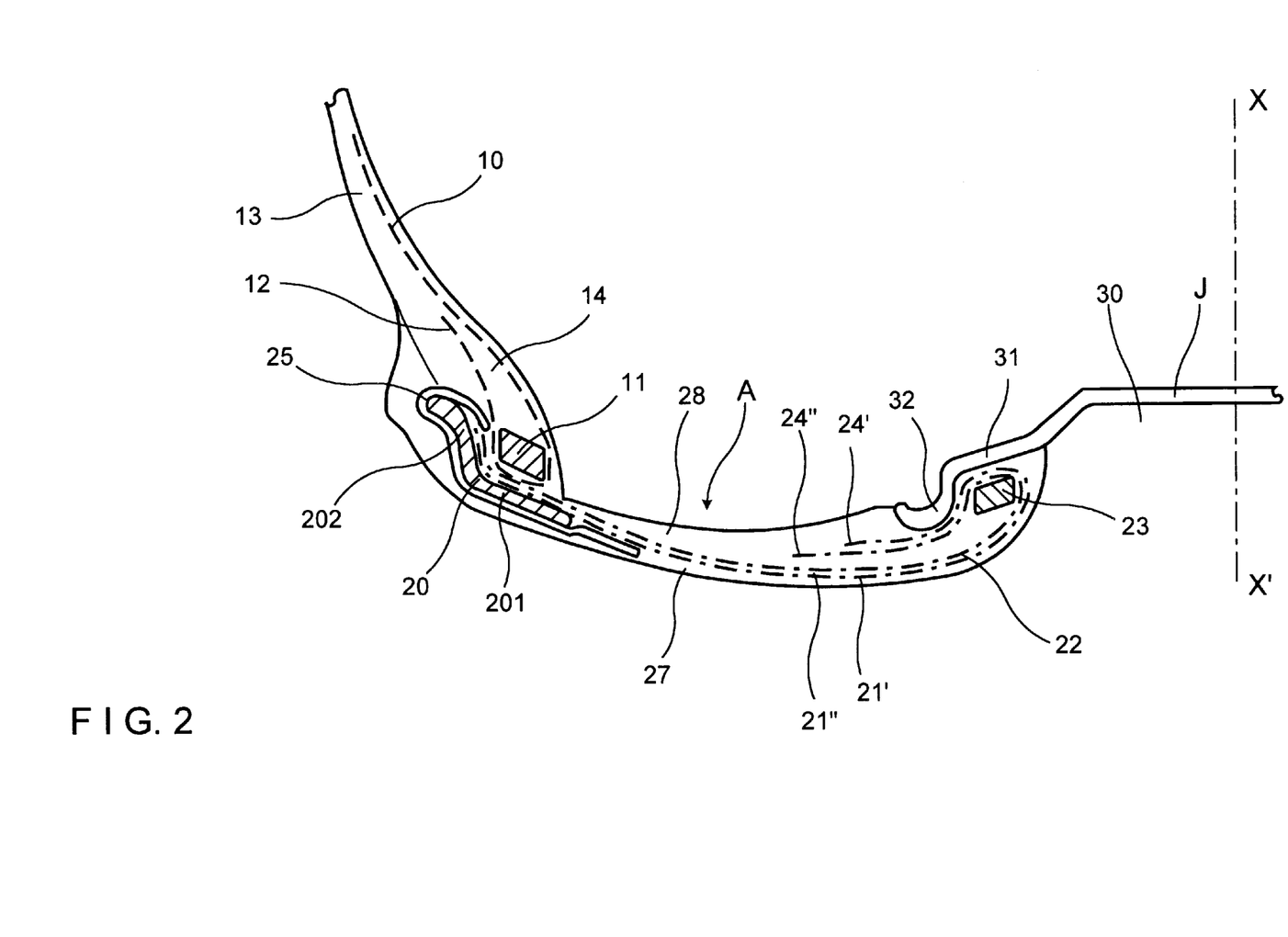
FIG. 2 is a diagram, viewed in meridian section, of a second embodiment of the assembly according to the invention.
Figure 5:
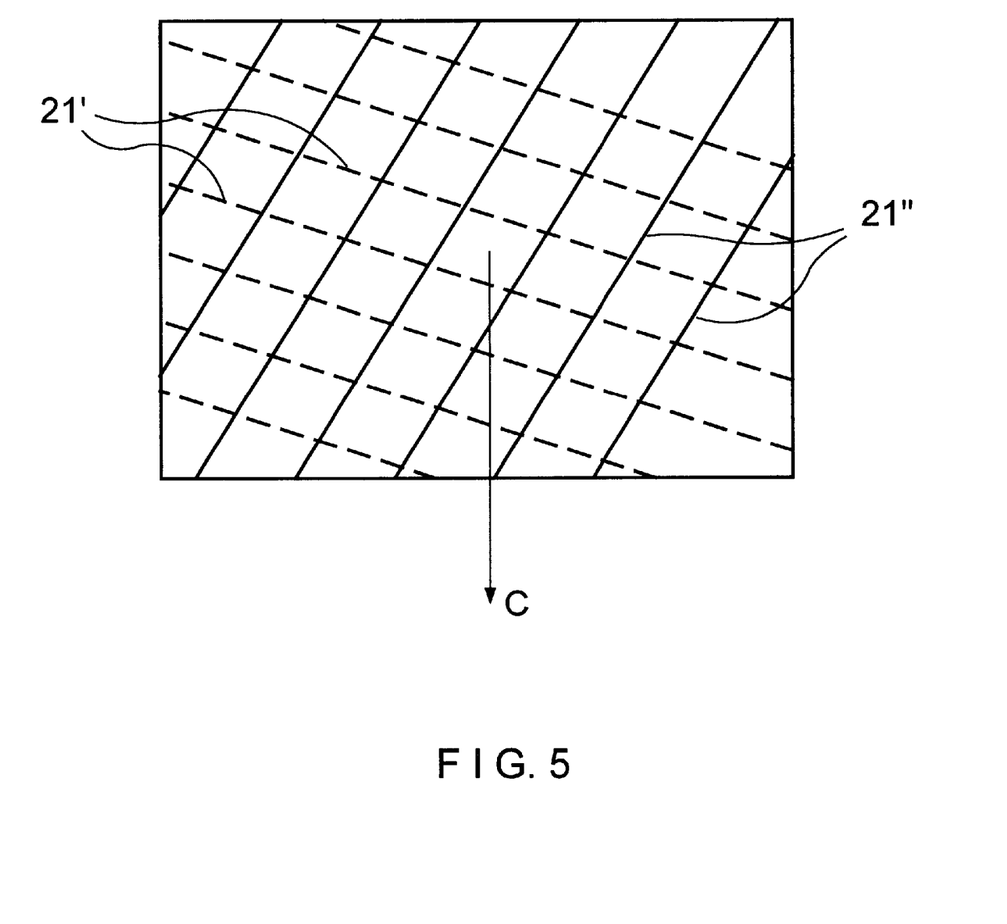
FIG. 5 is a schematic, detail view of the embodiment of FIG. 2, showing the reinforcement plies of the main reinforcement structure crossing from one ply to the next.

The main reinforcement structure 21 of the embodiment of FIG. 2 is formed of two plies of textile cables 21' and 21" made of polyester which are parallel to each other in each of the plies, but are crossed from one ply 21' to the next 21" so as to form with the circumferential direction C of the assembly an angle between 15° and 85°, e.g., an angle 45° as shown in FIG. 5. Such plies, as previously, are firstly joined axially to the inside and radially to the outside to the pre-treated walls of the adapter reinforcement 20 and are secondly anchored in each adapter bead 22 to an annular bead reinforcement element 23, such as a bead wire, to form upturns 24' and 24", the ends of which are axially offset relative to each other.

The main reinforcement structure 21 also includes, on the side of the reinforcement element 20 of the adapter A, an additional reinforcement 25 formed of the same fabric as previously made of textile elements, such reinforcement 25 partially covering the axially inner wall, then the upper end, and then the axially outer wall of the flange 202 and finally partially covering the radially inner wall of the seat 201 to have an edge joined to the main reinforcement structure 21. The axially inner end of the edge is distant from the equatorial plane X–X' by an amount less than the distance between the plane X–X' and the axially inner end of the seat 201. The adapter A is completed firstly, by the layers of protective rubber mix 27 and, secondly, on its radially inner face by the inner layer 28 of mix impermeable to the inflation gas.

Figure 3:
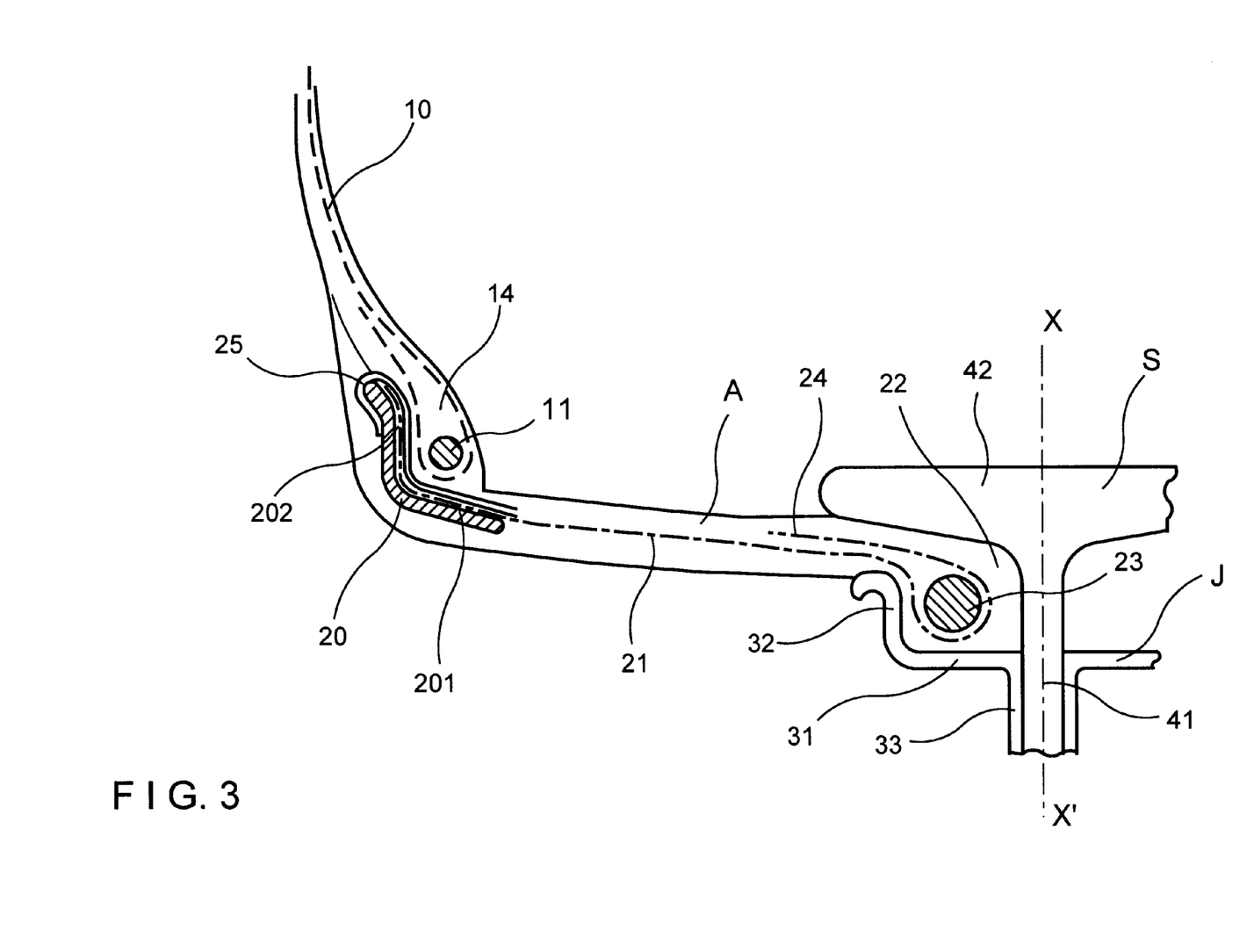
FIG. 3 is a diagram, viewed in meridian section, of an embodiment of an adapter bead and the hooking thereof to the rim.

The assembly of FIG. 3, wherein like parts are identified by like reference characters, differs from the assembly of FIG. 1 by the structure of the bead 22 of the adapter A and by the structure of the system for hooking the bead 22 on the mounting rim J. Such system is in fact formed of two elements: the rim J proper and a bead-clamping device or plate S. The rim J is formed of two conventional flanges 32 that are extended radially to the inside and axially to the inside by two flat rim seats 31, that in turn are extended radially towards the inside by two annular radial discs 33 that have a certain axial spacing there-between. Within such axial spacing there is housed radially mobile discs 41 comprised of at least three parts 42 which, when joined circumferentially, form the bead-clamping plate S. The axial width of the plate S is sufficient to permit the clamping and wedging of the beads 22 on the rim seats 31. The plate S may also advantageously serve as a support for the tread of the tire of the assembly when the tire is travelling at low or even zero pressure.

In the FIG. 3 embodiment, the adapter A is adapted insofar as its composition and its shape are concerned to the principle of hooking described above. In particular, it is advantageous for the reinforcement structure 21 of the adapter A to be anchored by winding around a ring 23 made of rubber which has a high modulus of compression but which is extensible in the circumferential direction. Furthermore, on the side of the reinforcement element 20 of the adapter A there is arranged an additional reinforcement 25 formed of a fabric identical to that previously described, formed of two layers of elements made of aliphatic polyamide which are parallel to each other within each ply and are crossed from one ply to the next, forming an angle of 45° with the circumferential direction, such reinforcement 25 partially covering the axially inner wall, then the upper end and then partially the axially outer wall of the flange 202 to have its outer end located at a radial distance from the axis of rotation corresponding to the center of the flange 202.

Figure 4:
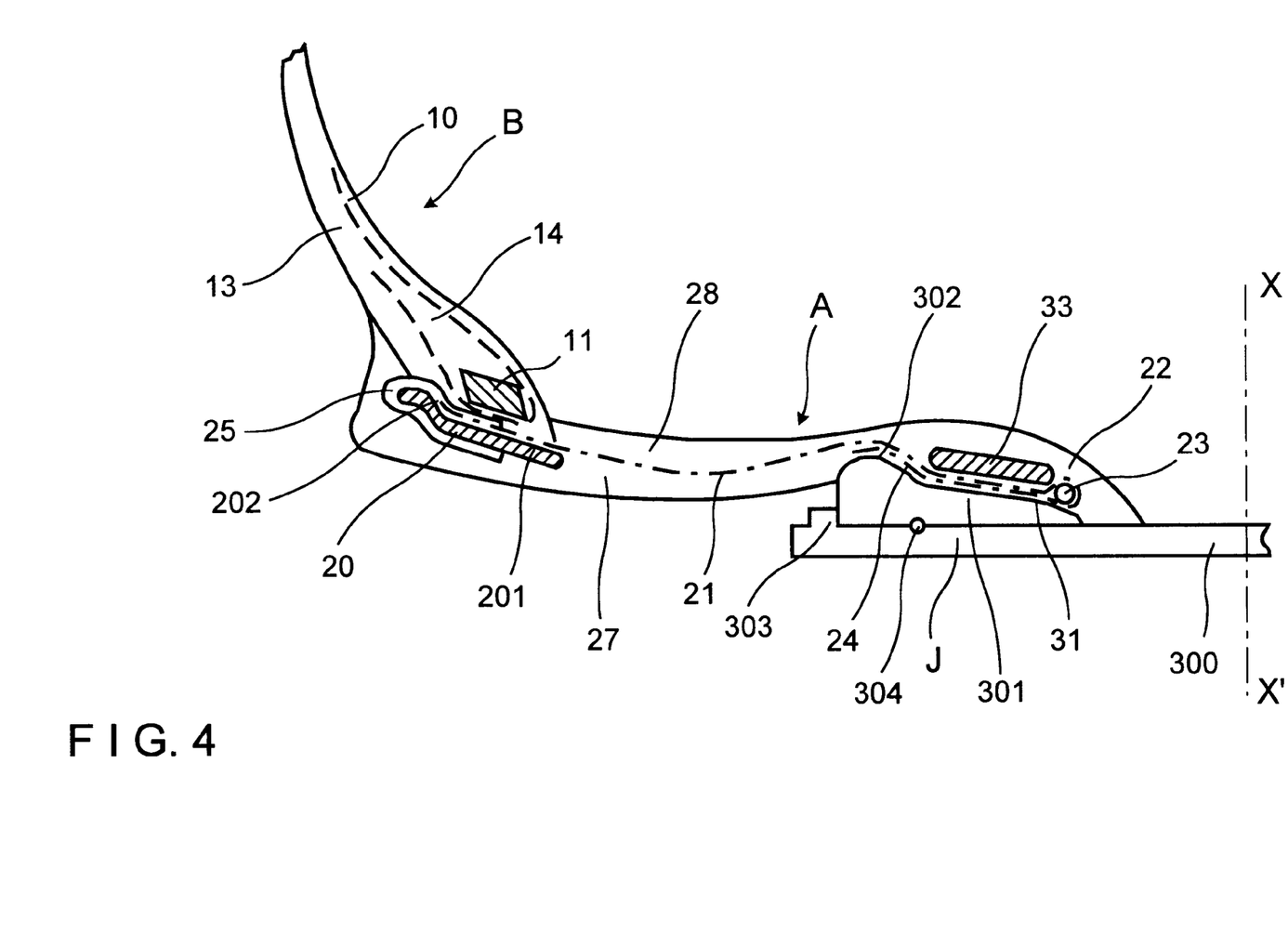
FIG. 4 is a diagram, viewed in meridian section, of another embodiment of an adapter bead.

A further embodiment of an assembly according to the invention is shown in FIG. 4, wherein like parts are identified by like reference characters. The tire P is identical to that shown and used in the assembly of FIG. 2. The mounting rim J is what is conventionally called a multi-part rim, at least two parts of which are mobile. Such a rim is of the same type as the rims used for mounting certain "heavy-vehicle" tires and "construction" tires. The rim is primarily composed of a rim base 300, which may be flat and which is extended on a single side (not shown) of the rim by a conical seat which, in turn, is extended by a rim circle or flange, the seat and flange being fixed on that side. On the axially opposite side, a single mobile part 31, formed of a flange 302 and a conical ring 301, may be slipped on to the rim base 300 after the bead 22 of the adapter A has itself been placed on the rim base 300.

An O-ring 304 for ensuring the airtightness of the assembly and a locking ring 303 for locking the assembly on the rim base complete the part 31. It will be understood by those skilled in the art that any bead 22 of whatever sort may be mounted on such a rim. The example described relates to a preferred variant in which the radial reinforcement structure 21 of the adapter A, which is composed of a ply of radial textile cables, and its upturn 24 are held tightly between the frustoconical seat of the mobile rim ring 301 and a reinforcement ring 33 having a radially inner face which itself is frustoconical. The generatrix of the radially inner face of the ring 33 preferably forms with the axis of rotation the same angle as that formed by the generatrix of the seat of the mobile conical ring of the part 31. The upturn 24 of the reinforcement structure 21 is obtained by winding the reinforcement about a circumferential ring 23 of small cross-sectional dimensions and low tensile strength, such ring 23 being used only to perfect the locking of the reinforcement between the two frustoconical surfaces of the ring 33 and the seat of the conical ring 301.

It is possible, in particular when such a rim is used, to connect both right-hand and left-hand adapters by an element of rubber mix that is simply vulcanized and/or reinforced, while remaining elastic.

What is claimed is:

1. A rolling assembly, comprising:
   a tire P having beads;
   a narrow mounting rim J, the axial width of which is less than the axial spacing between the tire beads and at most is equal to 50% of the maximum axial width of the tire inflated to its operating pressure; and
   two connecting adapters A formed of reinforced rubber mixes which are elastically deformable at least in both the radial and axial directions, said adapters A forming the connection between the mounting rim J and the beads of the tire P.

2. A rolling assembly as recited in claim 1, wherein each of said adapters A comprises:
   a bead which ensures hooking of the adapter A to the rim;
   an adapter reinforcement element having a modulus of extension and a module of compression which are substantially equal, for receiving a tire bead; and
   a main reinforcement structure permitting deformation in both the radial and axial directions of the adapter A, and creating the connection between the bead of the adapter A and the adapter reinforcement element.

3. A rolling assembly as recited in claim 1, wherein the narrow mounting rim J is devoid of a mounting groove and comprises two rim seats, said rim seats being adjoined axially to the outside by two rim flanges directed radially towards the outside, and being joined axially and radially towards the inside by two radial discs.

4. A rolling assembly as recited in claim 3, wherein the two radial discs are axially spaced apart and a bead-clamping plate S is fixed between said radial disks.

5. A rolling assembly as recited in claim 4, wherein said bead-clamping plate comprises a bearing support for the tread in the event of the tire travelling at low or even zero pressure.

6. A rolling assembly as recited in claim 1, wherein the mounting rim J comprises a flat rim base, said rim base, on one axial side of the rim, being adjoined by a conical seat which in turn is adjoined by a rim circle or flange, the seat and the flange being fixed on said one axial side, said rim base on the axially opposite side of the rim including a mobile part having a flange and a conical ring, said mobile part being adapted to be slipped onto the rim base, a locking ring for locking said mobile part on the rim base, and an O-ring for ensuring airtightness of the assembly.

7. A rolling assembly as recited in claim 2, wherein the mounting rim J includes a mounting groove which is directed towards the inside of the assembly, said groove being adjoined axially to the outside by frustoconical or flat seats, and said seats in turn being adjoined axially to the outside and radially towards the inside by rim flanges having curved edges, said seats receiving the beads of the adapters A.

8. A rolling assembly as claimed in claim 2, wherein the main reinforcement structure is composed of at least one ply of radial reinforcement elements.

9. A rolling assembly as claimed in claim 8, wherein each adapter bead includes a circumferential anchoring ring, and the main reinforcement structure is anchored within each adapter bead by winding around the respective circumferential anchoring ring, forming an upturn.

10. A rolling assembly as claimed in claim 9, wherein each circumferential anchoring ring includes circumferential reinforcing elements, and the main reinforcement structure is anchored within each adapter bead by clamping between said circumferential reinforcement elements of the respective circumferential anchoring ring.

11. A rolling assembly as claimed in claim 10, further comprising additional reinforcement for each adapter bead, and covering reinforcement for each adapter reinforcement element.

12. A rolling assembly as claimed in claim 11, wherein the additional covering reinforcement for each adapter reinforcement element is composed of at least one layer of reinforcement elements forming an angle of between 10° and 45° with the circumferential direction.

13. A rolling assembly as claimed in claim 12, wherein each adapter reinforcement element includes an axially outer wall and a radially inner wall, the additional covering reinforcement is joined to said axially outer and radially inner walls of said adapter reinforcement element, and the radially inner edge of said additional covering reinforcement is applied against the main reinforcement structure.

14. A rolling assembly as claimed in claim 9, further comprising additional reinforcement for each adapter bead, and additional covering reinforcement for each adapter reinforcement element.

15. A rolling assembly as claimed in claim 14, wherein the additional covering reinforcement for each adapter reinforcement element is composed of at least one layer of reinforcement elements forming an angle of between 10° and 45° with the circumferential direction.

16. A rolling assembly as claimed in claim 2, wherein the main reinforcement structure is composed of at least two plies of reinforcement elements which are parallel to each other within each ply and are crossed from one ply to the next, forming an angle between 15° and 85° with the circumferential direction of the assembly.

17. A rolling assembly as claimed in claim 16, wherein each adapter bead includes a circumferential anchoring ring, and the main reinforcement structure is anchored within each adapter bead by winding around the respective circumferential anchoring ring, forming an upturn.

18. A rolling assembly as claimed in claim 17, further comprising additional reinforcement for each adapter bead, and covering reinforcement for each adapter reinforcement element.

19. A rolling assembly as claimed in claim 18, wherein the additional covering reinforcement for each adapter reinforcement element is composed of at least one layer of reinforcement elements forming an angle of between 10° and 45° with the circumferential direction.

20. A rolling assembly as claimed in claim 2, wherein the adapter reinforcement element includes a radially outer face and a flange having an axially inner face, and said main reinforcement structure is joined to the adapter reinforcement element by gluing to the radially outer face of the seat and the axially inner face of the flange.

21. A rolling assembly as claimed in claim 2, wherein the main reinforcement structure is joined to the adapter reinforcement element by winding on the radially upper end thereof.

22. A rolling assembly as recited in claim 2, wherein each adapter bead includes a circumferencial anchoring ring and a bead reinforcement ring, the main reinforcement structure is anchored within each adapter bead by winding around said circumferential anchoring ring forming an upturn, said bead reinforcement ring having a frustoconical face directed towards the mounting rim J, and said mounting rim J having a frustoconcial face directed towards said frustoconcial face on the bead reinforcement ring, said upturn of main rein forcement structure being tightly held between the frustoconcial surface on said bead reinforcement ring and the frustoconcial surface on said mounting rim J.

23. A rolling assembly as recited in claim 1, wherein the narrow mounting rim J comprises two rim seats, each rim seat having a frustoconical generatrix and axially inner and axially outer ends, said rim J further comprising a radially directed rim flange adjoining the axially outer end of each rim seat, and a mounting groove joining the axially inner ends of the two rim seats.

* * * * *

UNITED STATES PATENT AND TRADEMARK OFFICE
CERTIFICATE OF CORRECTION

PATENT NO. : 6,626,217 B2
DATED : September 30, 2003
INVENTOR(S) : Luc Bestgen

It is certified that error appears in the above-identified patent and that said Letters Patent is hereby corrected as shown below:

Column 2,
Lines 19 and 25, "ovalisation" should read -- ovalization --

Column 4,
Line 16, "width 1," (numeral "one") should read -- width l, -- (lowercase "L")

Column 5,
Line 9, "In the" should read -- The --
Line 32, "angle 45°" should read -- angle of 45° --
Line 66, "there-between" should read -- therebetween --
Line 67, "is" should read -- are --

Column 6,
Line 40, "on to" should read -- onto --

Column 7,
Line 15, "module" should read -- modulus --

Column 8,
Line 59, "circumferencial" should read -- circumferential --
Line 66, "frustoconcial" (both occurrences) should read -- frustoconical --
Line 67, "main" should read -- said main --
Line 67, "rein" should be deleted Column 9,
Line 1, "forcement" should read -- reinforcement --
Lines 1-2 and 3, "frustoconcial" should read -- frustoconical --

Signed and Sealed this

Thirtieth Day of December, 2003

JAMES E. ROGAN
*Director of the United States Patent and Trademark Office*